United States Patent
Farnsworth et al.

(10) Patent No.: US 10,985,391 B2
(45) Date of Patent: Apr. 20, 2021

(54) REAL TIME ITERATIVE SOLUTION USING RECURSIVE CALCULATION

(71) Applicant: Toyota Motor Engineering & Manufacturing North America, Inc., Plano, TX (US)

(72) Inventors: Jared Farnsworth, Roseville, CA (US); Daniel Folick, Long Beach, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 389 days.

(21) Appl. No.: 15/913,204

(22) Filed: Mar. 6, 2018

(65) Prior Publication Data
US 2019/0280320 A1 Sep. 12, 2019

(51) Int. Cl.
*H01M 8/04746* (2016.01)
*H01M 8/04014* (2016.01)
(Continued)

(52) U.S. Cl.
CPC ......... *H01M 8/04768* (2013.01); *B60L 58/33* (2019.02); *H01M 8/04014* (2013.01);
(Continued)

(58) Field of Classification Search
CPC ......... H01M 8/04768; H01M 8/04014; H01M 8/04417; H01M 8/04358; H01M 8/04029;
(Continued)

(56) References Cited

U.S. PATENT DOCUMENTS 6,442,455 B1  8/2002  Kotre et al.
6,480,767 B2  11/2002  Yamaguchi et al.
(Continued)

FOREIGN PATENT DOCUMENTS

CN    202065044    12/2011
CN    202930480    5/2013
(Continued)

OTHER PUBLICATIONS

Pablo Guinta et al.; "Calculation of Multiplicity of Steady States in a Catalyst Pellet by Homotopic Continuation Method"; AIChE Journal; (40 pages).

*Primary Examiner* — Lisa S Park
(74) *Attorney, Agent, or Firm* — Snell & Wilmer LLP

(57) ABSTRACT

Methods, systems, and devices of a cooling system for controlling air or liquid flow. The fluid system includes one or more actuators that control the air or liquid flow. The fluid system includes multiple interconnecting pipes that transport the air or liquid flow. Each pipe may have a mass flow for the air or liquid flow. The fluid system includes an electronic control unit. The electronic control unit is configured to determine an initial mass flow of the air or liquid flow. The electronic control unit is configured to determine the mass flow for each pipe based on the initial mass flow. The electronic control unit is configured to predict a cooling capability of the air or liquid flow within each pipe and control the one or more actuators to regulate or control cooling of one or more components of the vehicle based on the predicted cooling capability.

20 Claims, 6 Drawing Sheets

(51) Int. Cl.
*H01M 8/04029* (2016.01)
*H01M 8/0438* (2016.01)
*H01M 8/0432* (2016.01)
*B60L 58/33* (2019.01)

(52) U.S. Cl.
CPC ... *H01M 8/04029* (2013.01); *H01M 8/04358* (2013.01); *H01M 8/04417* (2013.01); *H01M 2250/20* (2013.01)

(58) Field of Classification Search
CPC .......... H01M 2250/20; H01M 8/04992; B60L 58/33; Y02T 90/40
See application file for complete search history.

(56) References Cited

U.S. PATENT DOCUMENTS

| | | | |
|---|---|---|---|
| 6,635,374 B1 | 10/2003 | Aramaki | |
| 6,847,188 B2 | 1/2005 | Keskula et al. | |
| 6,924,050 B2 | 8/2005 | Lahiff | |
| 6,936,359 B2 | 8/2005 | Kobayashi et al. | |
| 7,117,078 B1 | 10/2006 | Gangopadhyay | |
| 7,124,040 B2 | 10/2006 | Engelhardt et al. | |
| 7,141,326 B2 | 11/2006 | Kobayashi et al. | |
| 7,247,401 B2 | 7/2007 | Aberle et al. | |
| 7,348,082 B2 | 3/2008 | Kolodziej | |
| 7,353,900 B2 | 4/2008 | Abe et al. | |
| 7,608,011 B2 | 10/2009 | Grabowski et al. | |
| 7,612,532 B2 | 11/2009 | Verbrugge | |
| 7,682,717 B2 | 3/2010 | Ueda et al. | |
| 7,682,719 B2 | 3/2010 | Lienkamp et al. | |
| 7,687,164 B2 | 3/2010 | Frost et al. | |
| 7,845,187 B2 | 12/2010 | Patel et al. | |
| 7,919,211 B2 | 4/2011 | Nonobe et al. | |
| 8,044,534 B2 | 10/2011 | Kojima et al. | |
| 8,141,356 B2 | 3/2012 | Leone et al. | |
| 8,153,321 B2 | 4/2012 | Katano | |
| 8,215,428 B2 | 7/2012 | Lee et al. | |
| 8,293,413 B2 | 10/2012 | Bono | |
| 8,342,275 B2 | 1/2013 | Ojima et al. | |
| 8,394,542 B2 | 3/2013 | Elwart et al. | |
| 8,486,574 B2 | 7/2013 | Jenings | |
| 8,498,766 B2 | 7/2013 | Takahashi et al. | |
| 8,561,453 B2 | 10/2013 | Hobmeyr et al. | |
| 8,568,935 B2 | 10/2013 | Arthur et al. | |
| 8,673,515 B2 | 3/2014 | Harris et al. | |
| 8,684,117 B2 | 4/2014 | Ptacek et al. | |
| 8,691,456 B2 | 4/2014 | Choe et al. | |
| 8,715,875 B2 | 5/2014 | Chan et al. | |
| 8,722,263 B2 | 5/2014 | Cai et al. | |
| 8,754,392 B2 | 6/2014 | Caimi et al. | |
| 8,757,223 B2 | 6/2014 | Uemura | |
| 8,796,984 B2 | 8/2014 | Yoshida et al. | |
| 8,846,262 B2 | 9/2014 | Mussro et al. | |
| 8,920,995 B2 | 12/2014 | Lebzelter et al. | |
| 8,935,029 B2 | 1/2015 | Sabrie et al. | |
| 8,951,685 B2 | 2/2015 | Aso et al. | |
| 8,956,778 B2 | 2/2015 | Zhang et al. | |
| 8,962,208 B2 | 2/2015 | Mussro et al. | |
| 8,986,899 B2 | 3/2015 | Harris et al. | |
| 8,997,771 B2 | 4/2015 | Lee et al. | |
| 9,002,568 B2 | 4/2015 | Datta et al. | |
| 9,005,785 B2 | 4/2015 | Alp et al. | |
| 9,021,824 B2 | 5/2015 | Koo et al. | |
| 9,099,701 B2 | 8/2015 | Maslyn et al. | |
| 9,187,009 B2 | 11/2015 | Jeon et al. | |
| 9,242,532 B2 | 1/2016 | Kim et al. | |
| 9,242,573 B2 | 1/2016 | Lee et al. | |
| 9,281,532 B2 | 3/2016 | Lebzelter et al. | |
| 9,281,533 B2 | 3/2016 | Ozawa et al. | |
| 9,312,549 B2 | 4/2016 | Tachibana et al. | |
| 9,318,778 B2 | 4/2016 | Wahlstrom et al. | |
| 9,358,900 B2 | 6/2016 | Wake et al. | |
| 9,437,884 B2 | 9/2016 | Kolodziej | |
| 9,457,640 B2 | 10/2016 | Ikeya | |
| 9,472,818 B2 | 10/2016 | Kilmer | |
| 9,527,404 B2 | 12/2016 | Gauthier et al. | |
| 9,531,019 B2 | 12/2016 | Jeon | |
| 9,590,259 B2 | 3/2017 | Toida | |
| 9,614,236 B2 | 4/2017 | Yu et al. | |
| 9,620,796 B2 | 4/2017 | Tomita et al. | |
| 9,620,799 B2 | 4/2017 | Igarashi et al. | |
| 9,643,517 B2 | 5/2017 | Watanabe et al. | |
| 2003/0105562 A1 | 6/2003 | Hsiao et al. | |
| 2004/0018399 A1 | 1/2004 | Jung | |
| 2006/0134472 A1 | 6/2006 | Bach et al. | |
| 2008/0286622 A1 | 11/2008 | Shaw et al. | |
| 2009/0050082 A1 | 2/2009 | Iwasaki | |
| 2011/0214930 A1 | 9/2011 | Betts et al. | |
| 2012/0129059 A1 | 5/2012 | Ohashi | |
| 2014/0000859 A1* | 1/2014 | Abihana | F01P 7/167 165/202 |
| 2014/0000862 A1 | 1/2014 | Abihana et al. | |
| 2014/0103128 A1 | 4/2014 | Patel et al. | |
| 2014/0120440 A1 | 5/2014 | Nolan et al. | |
| 2014/0335432 A1 | 11/2014 | Sinha et al. | |
| 2014/0342253 A1 | 11/2014 | Lee et al. | |
| 2014/0370412 A1 | 12/2014 | Sumser et al. | |
| 2015/0188157 A1 | 7/2015 | Na et al. | |
| 2015/0236361 A1* | 8/2015 | Kells | H01M 8/2484 429/434 |
| 2016/0006049 A1 | 1/2016 | Kwon et al. | |
| 2016/0137096 A1 | 5/2016 | Oda et al. | |
| 2016/0141645 A1 | 5/2016 | Yamada et al. | |
| 2016/0141661 A1 | 5/2016 | Kim et al. | |
| 2016/0141666 A1 | 5/2016 | Shim et al. | |
| 2016/0153367 A1 | 6/2016 | Yoon | |
| 2016/0172696 A1 | 6/2016 | Milacic et al. | |
| 2016/0211536 A1 | 7/2016 | Kwon et al. | |
| 2016/0336607 A1 | 11/2016 | Lee et al. | |
| 2016/0359181 A1 | 12/2016 | Lee | |
| 2016/0372768 A1 | 12/2016 | Proctor et al. | |
| 2017/0012310 A1 | 1/2017 | Han et al. | |
| 2017/0047603 A1 | 2/2017 | Kazuno | |
| 2017/0092972 A1 | 3/2017 | Pence | |
| 2017/0162885 A1 | 6/2017 | Kim | |
| 2017/0179511 A1 | 6/2017 | Jung et al. | |

FOREIGN PATENT DOCUMENTS

| | | |
|---|---|---|
| CN | 105895941 | 8/2016 |
| DE | 102012224052 | 6/2014 |
| GB | 2533015 | 6/2016 |
| JP | 2005347008 | 12/2005 |
| KR | 100863649 | 10/2008 |
| WO | WO2005078257 | 8/2005 |
| WO | WO2013073457 | 5/2013 |

* cited by examiner

REAL TIME ITERATIVE SOLUTION USING RECURSIVE CALCULATION

BACKGROUND

1. Field

The present disclosure relates to systems and methods for controlling the air and/or liquid flow through one or more pipes and one or more components.

2. Description of the Related Art

Vehicles, such as electric vehicles (EV), have fuel cells and other components that operate within specific operational parameters, such as temperature, air/liquid flow rate, resistance and/or pressure. When operating within operational parameters, the vehicle operates at peak efficiency and the components of the vehicle operate within hardware limitations so as not to damage the components and/or operate inefficiently when generating electrical energy.

A vehicle controls the air or liquid flow to maintain the stability and the reliability of one or more components, such as the radiator, the compressor, the cooling water circulation, the humidifier, the pumps and/or the fuel cell stack to maintain the stability and reliability of the components including the fuel cells of the fuel stack device, which generate electrical energy.

A typical system may use one or more sensors to measure the air or liquid flow rate, the temperature, the pressure that flows through the interconnected pipes to determine any necessary adjustments to maintain the reliability of the components. This, however, results in the system requiring additional hardware and does not predict the measurements, but instead, reactively measures the parameters.

Alternatively, some systems use a numerical solver that iterates to estimate the flow split through a fluid system, but the numerical solver is computationally intensive, which may require offline calculations and/or may result in delays in reacting to changing inputs.

Accordingly, there is a need for a system and a method to predictively estimate the cooling capability of the air or liquid flow at each pipe branch in real-time and control the components of the vehicle.

SUMMARY

In general, one aspect of the subject matter described in this specification is embodied in a fluid system. The fluid system includes one or more actuators that control the air or liquid flow. The fluid system includes multiple interconnecting pipes that transport the air or liquid flow. Each pipe may have a mass flow for the air or liquid flow. The fluid system includes an electronic control unit. The electronic control unit is configured to determine an initial mass flow of the air or liquid flow. The electronic control unit is configured to determine the mass flow for each pipe based on the initial mass flow. The electronic control unit is configured to predict a cooling capability of the air or liquid flow within each pipe and control the one or more actuators to regulate or control cooling of one or more components of the vehicle based on the predicted cooling capability.

These and other embodiments may optionally include one or more of the following features. The electronic control unit may be configured to calculate the initial mass flow using an interpolated homotopic operating state model. The fluid system may include an actuator controller. The actuator controller may be connected to the one or more actuators and may be configured to control the one or more actuators. The one or more actuators may include at least one of a pump, a three-way valve or a radiator fan that manages or controls the air or liquid flow through the pipes. The electronic control unit may be configured to cause the actuator controller to adjust at least one of the one or more actuators. The electronic control unit may be configured to open, partially open or close at least one way of a three-way valve to control a position of the three-way valve, adjust a speed of the radiator fan or adjust a speed of the pump.

The electronic control unit may be configured to calculate the mass flow in real-time. The electronic control unit may calculate one or more flow splits within the multiple interconnecting pipes using a recursive algorithm to calculate the mass flow. The multiple interconnecting pipes may include a first pipe, a second pipe and a third pipe. The first pipe may be connected to and branches or splits off into the second pipe and the third pipe. The electronic control unit may be configured to calculate a flow split from the first pipe to the second pipe and the third pipe.

The fluid system may include multiple components. The multiple components may include a fuel cell stack, an inter cooler and a radiator. The multiple pipes may connect the multiple components.

In another aspect, the subject matter is embodied in a method for controlling air or liquid flow. The method includes determining an initial mass flow of the air or liquid flow in multiple interconnected pipes. The multiple interconnected pipes have one or more flow splits. The method includes determining at least one of a temperature or a mass flow of the air or liquid flow in each pipe. The method includes determining a flow resistance of the air or liquid flow in each pipe at one of the one or more flow splits. The method includes determine an estimated flow split based on the determined flow resistance, and controlling the air or liquid flow based on the estimated flow split.

In another aspect, the subject matter is embodied in a fluid system for providing air or liquid flow. The fluid system includes a pump configured to pump the air or liquid flow. The fluid system includes a fuel stack configured to receive the air or liquid flow. The fluid system includes multiple pipes each configured to transport the air or liquid flow. The fluid system includes an actuator controller to control the pump, a radiator fan or a three-way valve. The fluid system includes an electronic control unit that is connected to the actuator controller. The electronic control unit is configured to determine an initial mass flow. The electronic control unit is configured to determine at least one of a temperature or mass flow in each pipe. The electronic control unit is configured to determine a flow resistance in each pipe and control the air or liquid flow based on the determined flow resistance.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Disclosed herein are systems, vehicles and methods for estimating the air or liquid flow through a flow split when a pipe branches off into multiple other pipes among multiple interconnected pipes. The cooling system estimates the air or liquid flow through the flow split and controls one or more actuators, such as a compressor, a radiator fan or a three-way valve to control the air or liquid flow so that the fuel cell stack operates at peak efficiency. The cooling system may provide the air or liquid flow to control temperature within components of the vehicle, such as the fuel cell stack, for the generation of electrical energy.

A fluid or cooling system ("cooling system") embedded, integrated and/or integrated within a vehicle controls and/or manages the air or liquid flow to one or more components to regulate and/or control temperature, pressure and other parameters within components of the vehicle, such as the fuel cell stack, the inter cooler and the compressor by directing air or liquid through various interconnected pipes. In particular, the cooling system may control the air or liquid flow to adjust the temperature in the fuel cell stack and the radiator since the temperature affects fluid viscosity, and in turn, flow resistance.

The cooling system controls one or more actuators, such as the compressor, the radiator fan and/or the three-way valve to adjust and/or control the air or liquid flow through the interconnected pipes that connect the actuators and components within the vehicle. The cooling system adjusts the air or liquid flow to control the various parameters so that the components operate within their hardware limitations and operate at peak efficiency, which improves the efficiency of the electrical energy generation by the fuel cell stack. Moreover, by adjusting the air or liquid flow, the cooling system prevents damage and/or additional wear on the components.

Other benefits and advantages include the capability to estimate the measurements of the different parameters of the air or liquid flow within each interconnected pipe. This provides a more accurate estimation of the different parameters within the components of the vehicle. Moreover, by calculating the estimation, the cooling system does not require additional sensors or other hardware to obtain the measurements, which reduces cost and maintenance and saves space within the vehicle. Additionally, the calculation of the estimation may be done in real-time, and thus, the cooling system may more quickly adjust to present conditions, since components of the vehicle are constantly generating and rejecting heat which varies temperatures within the vehicle.

Figure 1:
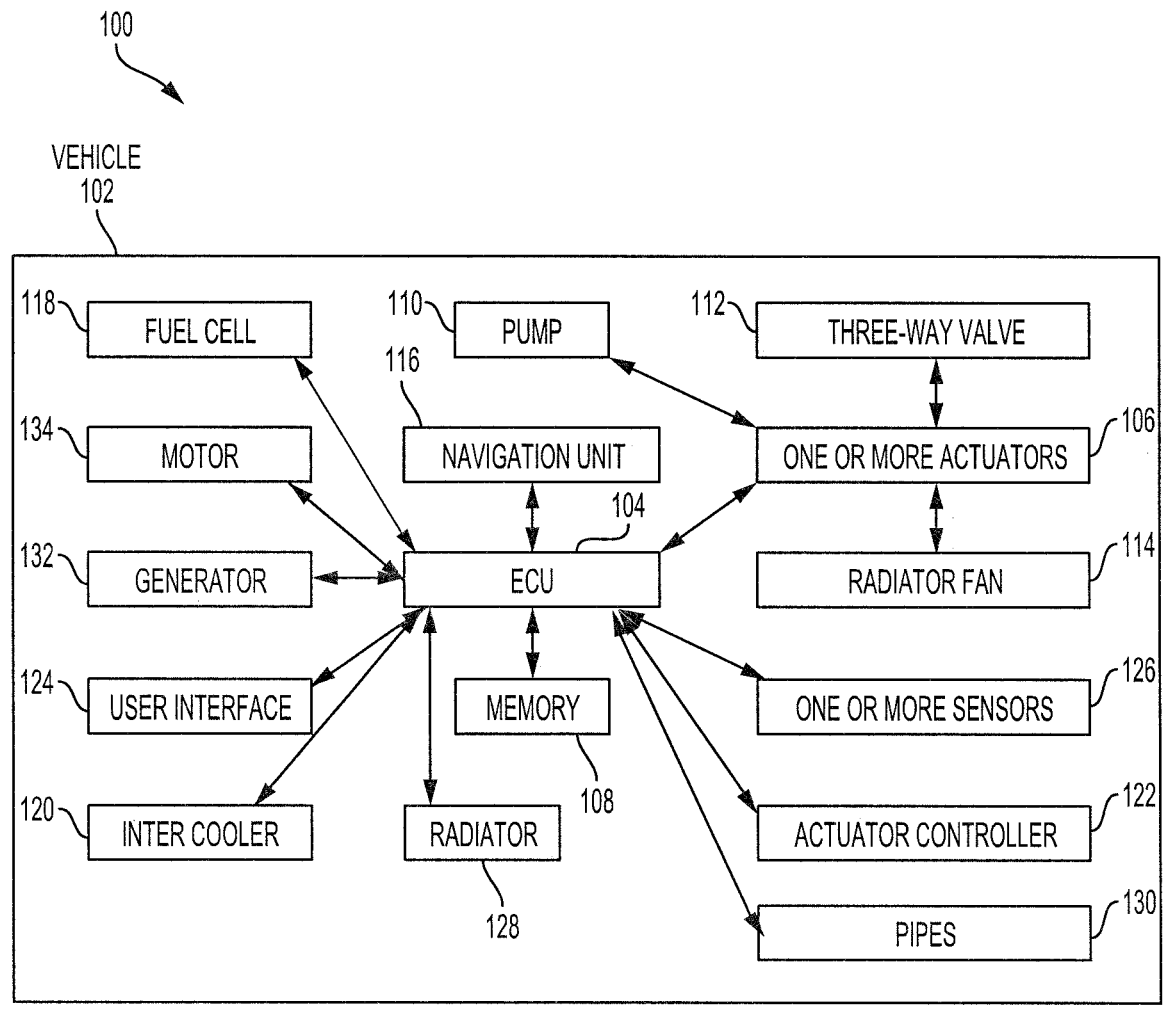
FIG. 1 is a block diagram that shows an example fluid or cooling system ("cooling system") within a vehicle according to an aspect of the invention.

FIG. 1 shows a fluid or cooling system ("cooling system") 100. The cooling system 100 may be included, integrated, embedded, retrofitted or otherwise connected within the vehicle 102. The cooling system 100 provides control over the air and/or liquid flow within the vehicle 102 to manage, regulate and/or control temperature, pressure and other parameters within components of the vehicle 102. The cooling system 100 estimates, predicts and/or determines various parameters, such as the temperature, the flow resistance or rate, and/or the pressure within components of the vehicle 102 and/or within interconnecting pipes that feed air or liquid to other components, such as the fuel cell 118, the radiator 128 and/or the inter cooler 120. The cooling system 100 predicts the cooling capability of the air or liquid using these parameters in real-time.

The cooling system 100 includes one or more actuators 106, a fuel cell 118, an inter cooler 120, a memory 108, multiple interconnecting pipes 130 and a processor, such as the electronic control unit (ECU) 104 or an actuator controller 122. The cooling system 100 may include a user interface 124 and/or one or more sensors 126. The cooling system 100 includes a processor that is programmed to estimate, predict or determine the parameters of the air or liquid within the interconnecting pipes 130, and in response, control or manage the air or liquid flow within the pipes 130 to adjust and predict the cooling capability of the air or liquid flow within the cooling system 100.

The cooling system 100 includes an actuator controller 122. The actuator controller 122 provides one or more actuator control requests to the ECU 104 and/or the one or more actuator 106. The actuator control requests may indicate various targets, such as speed, temperature and/or pressure for the air or liquid flow within the one or more pipes 130 and/or for each component, such as the fuel cell 118, the radiator 128 and/or the inter cooler 120. The actuator controller 122 initiates changes to the positions or settings of the one or more actuators 106 to set or adjust the parameters to the various targets.

Figure 3:
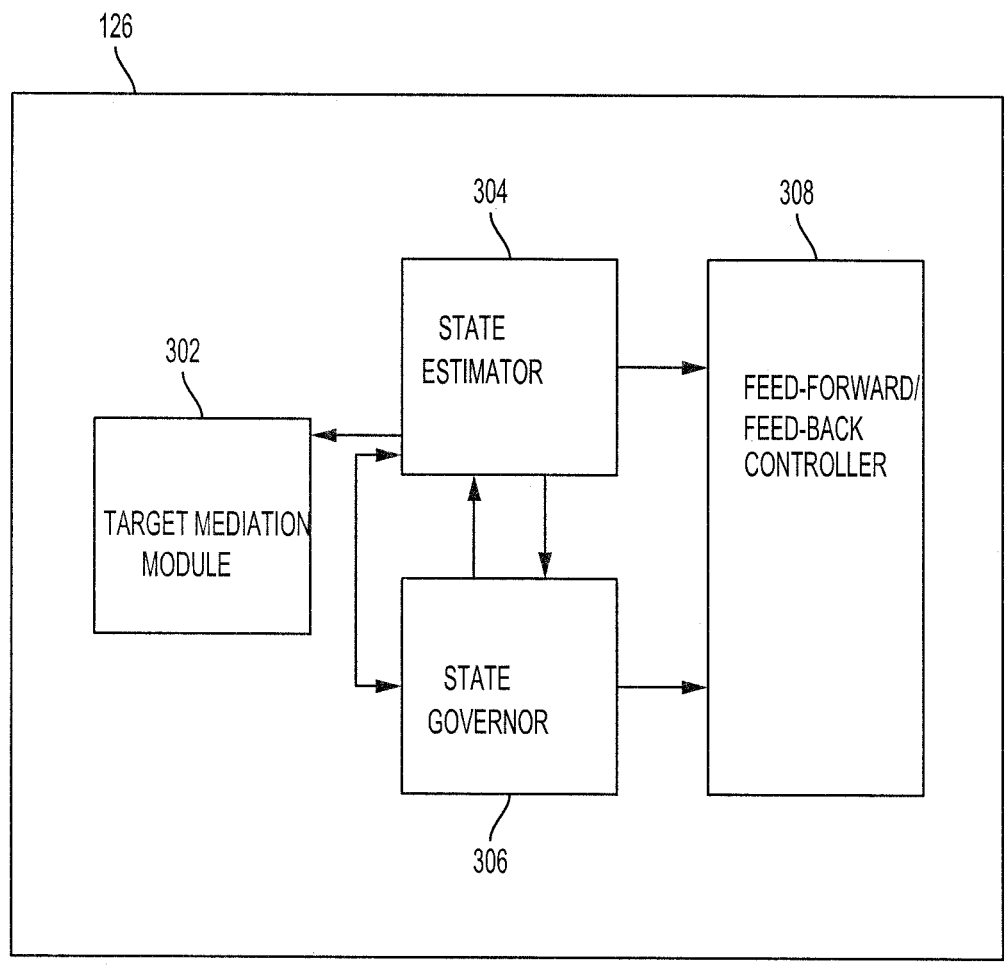
FIG. 3 is a block diagram of modules within the actuator controller of the cooling system of FIG. 1 according to an aspect of the invention.

The actuator controller 122 may have one or more modules, such as the target mediation module 302, the state estimator 304, the state governor 306, and/or the feed-forward/feed-back controller 308, as shown in FIG. 3, for example. The target mediation module 302 may modify the various targets based on hardware limitations of the components, such as the radiator 128, the fuel cell 118 and/or the inter cooler 120. The state estimator 304 may estimate the current state and/or the target state of the one or more parameters of the air or liquid flow within the one or more components and/or the one or more pipes 130. The state governor 306 may set a target state for the one or more components and may coordinate the one or more actuators to control the parameters of the one or more components. The feed-forward/feed-back controller 308 may provide the actuator control request to the one or more actuators 106 to move and/or position the three-way valve 112, set the motor speed of the pump 110, and/or set the motor speed of the radiator fan 114 to control the parameters for the one or more components. The actuator control request may include the amount of torque used to position the three-way valve 112.

The cooling system 100 includes a processor, such as the ECU 104. The ECU 104 may be implemented as a single ECU or as multiple ECUs. The ECU 104 may be electrically coupled to some or all of the components of the vehicle 102, such as the generator 132, the motor 134 and/or the navigation unit 116. The ECU 104 may include one or more processors or controllers specifically designed for controlling the one or more actuators 106 and/or obtaining data from the one or more sensors 126 to control various targets, e.g., for speed, pressure, flow rate or resistance and/or temperature, for the air or liquid within the one or more components or pipes 130 of the cooling system 100. The ECU 104 may be coupled to a memory 108 and execute instructions that are stored on the memory 108.

The memory 108 may be coupled to the ECU 104 and store instructions that the ECU 104 executes. The memory 108 may include one or more of a Random Access Memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 104.

The cooling system 100 includes one or more actuators 106. The one or more actuators 106 include a pump 110, a radiator fan 114 and a three-way valve 112. The pump 110 may have a setting that controls the speed of a motor that spins an impeller that draws air or liquid into and/or out of the pump to control the flow rate of the air or liquid into the one or more pipes 130. The three-way valve 112 may be positioned into an open, a partially open or a closed position to control the air or liquid flow into the pipes 130 that lead to the radiator, the fuel cell 118 and/or the inter cooler 120. The radiator fan 114 may have a setting that controls the speed of a motor that spins an impeller that draws air into and/or out of the radiator fan to control the airflow to and from the radiator 128.

The cooling system 100 includes one or more components. The one or more components may include one or more heat sources, such as the inter cooler 120 and the fuel cell 118. The inter cooler 120 cools air or liquid that flows into the inter cooler 120 before the air or liquid enters into the fuel cell 118. The inter cooler 120 removes heat from the air or liquid so that the temperature of the air or liquid is below a maximum temperature level before the air or liquid flows into the fuel cell 118. The fuel cell 118 may chemically fuse oxygen from the air and hydrogen from the fuel tank to make water and release electrical energy that powers the motor 134 of the vehicle 102. The one or more components may include a heat sink, such as the radiator 128. The radiator 128 may have one or more sub-radiators 128b and a main radiator 128a.

Figure 2:
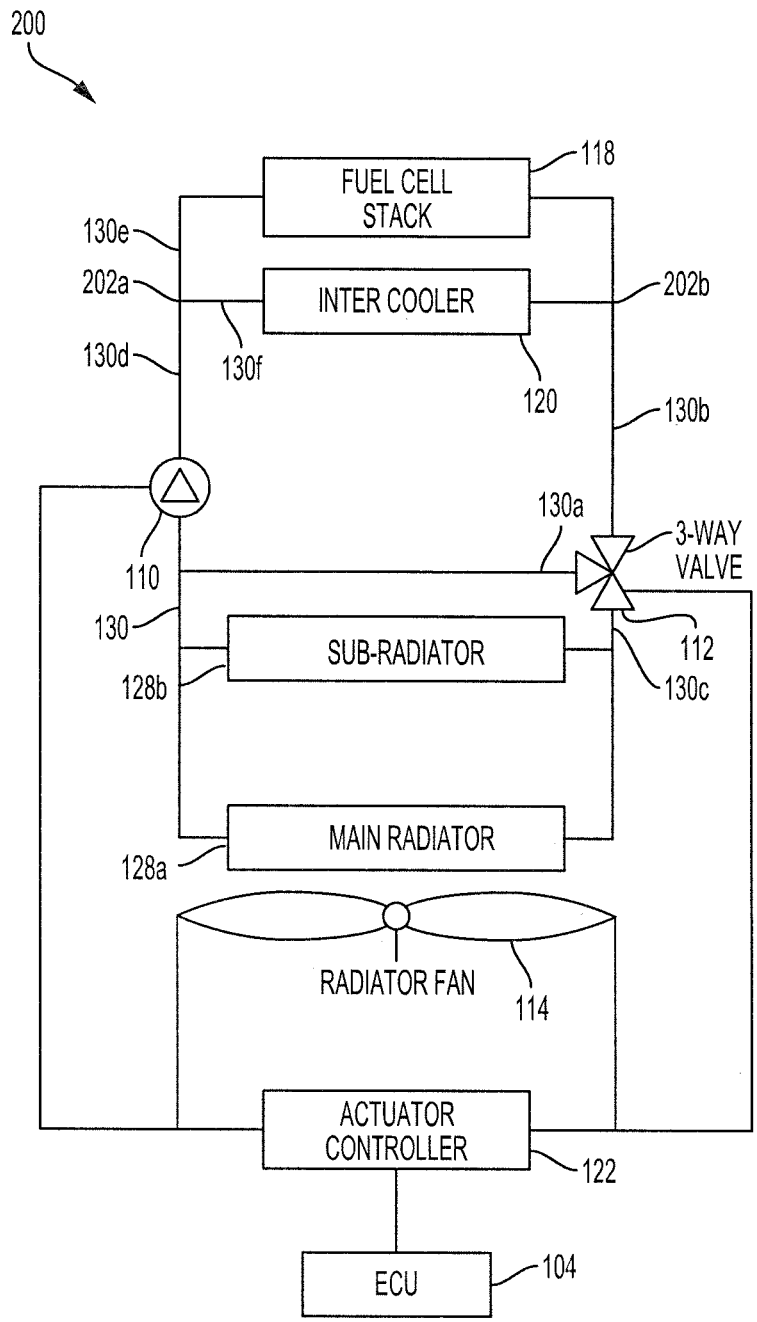
FIG. 2 is a schematic diagram of the interconnection among the one or more actuators with the one or more components of the cooling system of FIG. 1 according to an aspect of the invention.

The cooling system 100 includes multiple interconnecting pipes 130. The air or liquid flow through the multiple interconnecting pipes 130 among the one or more components and the one or more actuators 106. FIG. 2 describes the interconnection of the one or more actuators 106 with the one or more components of the vehicle 102 through the various interconnected pipes 130.

The cooling system 100 may include one or more sensors 126. The one or more sensors 126 may include a temperature sensor that measures an ambient temperature of the air or liquid. The one or more sensors 126 may include a pressure sensor that measures the ambient pressure of the liquid or air. The one or more sensors 126 may include a flow sensor that measures the flow rate. The one or more sensors 126 may include a speed sensor that measures the speed of the motor of the pump 110 or the radiator fan 114. The one or more sensors 126 may measure the various parameters for the air or liquid flow into or out of the one or more components, into or out of the one or more actuators 106, and/or within the one or more pipes 130.

The cooling system 100 may include a user interface 124. The cooling system 100 may display one or more notifications on the user interface 124 that indicate initialization of the cooling system 100 or an adjustment by the cooling system 100 when managing and/or controlling the air or liquid flow. The cooling system 100 may display the actual or estimated operating temperature, the flow resistance or rate, the speed or pressure for the liquid or air flowing through the one or more components.

The cooling system 100 is included in a vehicle 102. A vehicle 102 is a conveyance capable of transporting a person, an object, or a permanently or temporarily affixed apparatus. The vehicle 102 may be a self-propelled wheeled conveyance, such as a car, sports utility vehicle, truck, bus, van or other motor or battery driven or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell 118, a motor 134 and/or a generator 132. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors 126 and/or navigation unit 116 to drive autonomously.

The vehicle 102 may include a motor 134 and/or a generator 132. The motor 134 and/or generator 132 may be an electric motor and an electric generator that converts electrical energy into mechanical power, such as torque, and converts mechanical power into electrical energy.

The vehicle 102 may include a navigation unit 116 that obtains navigational map information and/or vehicle information to autonomously navigate the vehicle 102 and/or display to the user through the user interface 124. The navigational map information may include a map that identifies roadways, terrains and other points of interest to navigate the vehicle 102. The navigational map information may include route information that includes a starting point, a destination point and a path of travel from the starting point to the destination point for the vehicle 102. The vehicle information may include a current location of the vehicle 102, a current direction of travel of the vehicle 102 and/or a current speed of the vehicle 102.

FIG. 2 shows the interconnection of the one or more actuators 106 with the one or more components through the various interconnected pipes 130. The ECU 104 may be electrically coupled to and provide instructions to the actuator controller 122. The actuator controller 122 may control the one or more actuators 106 that include the pump 110, the three-way valve 112 and/or the radiator fan 114.

The actuator controller 122 may adjust a position of the three-way valve 112 to an open, a partially open or a closed position. For example, the three-way valve 112 may be positioned to partially open the inlet/outlet for the pipe 130a, completely open the inlet/outlet to the pipe 130b and close the inlet/outlet to the pipe 130c. The three-way valve 112 may position the inlet/outlet using any combination for the inlets/outlets leading to the pipes 130a-c. The actuator controller 122 may use a motor, such as a stepper motor, a servo motor, a hydraulic motor, a pneumatic or other generic motor to open, partially open or close the position of the three-way valve 112.

The actuator controller 122 may adjust the speed of a motor of the pump 110 that affects the specific speed and/or suction speed of the pump 110 to control the amount and/or the rate of the air or liquid flow into and out of the pump 110. The motor may power an impeller of the pump 110 to create the suction force that draws the air or liquid into the pump 110. The pump 110 may provide the air or liquid flow to the inter cooler 120 and/or the fuel cell 118 through the pipes 130.

The actuator controller 122 may adjust the speed of a motor of the radiator fan 114 that turns an impeller to create a suction force that draws the air into the radiator 128. The speed of the impeller controls the amount of air and/or the air flow rate of the air into the radiator 128 through the pipes 130 to cool the radiator 128.

The multiple interconnecting pipes 130 may have one or more pipe junctions 202a-b. The one or more pipe junctions 202a-b are where a single pipe branches off into multiple pipes or where multiple pipes reunite to form a single pipe. A pipe junction 202a where a single pipe splits or branches off into multiple pipes may also be referred to as a pipe split. For example, pipe 130d splits or branches off into pipes 130e and 130f at the location of the pipe split 202a. The pipe 130e directs the air or liquid flow to the fuel cell 118 and the pipe 130f directs the air or liquid flow to the inter cooler 120. A pipe may split or branch off into any number of pipes. The pipes that have split or branched off from the original pipe may run in parallel and may have the same pressure drop across parallel running pipes. The ECU 104 may estimate the air or liquid flow resistance at the one or more pipe junctions 202a-b to control the air or liquid flow into the branches of the pipe to adjust the cooling capability. The ECU 104 controls the air or liquid flow into the branches of the pipe based on the estimation of the air or liquid flow resistance for each pipe at the one or more pipe junctions 202a-b to control air or liquid pressure, flow rate or temperature into the one or more components using the actuator controller 122 and the one or more actuators 106.

Figure 4:
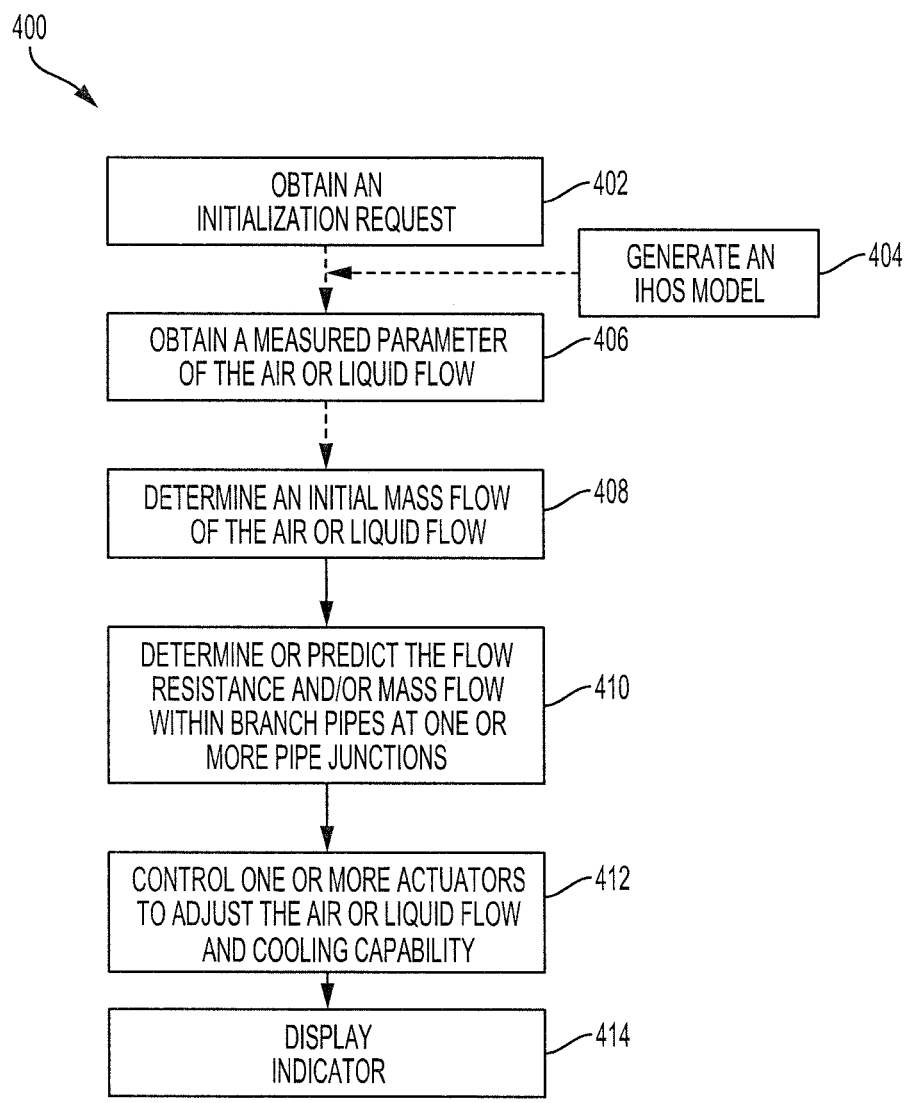
FIG. 4 is a flow diagram of an example process for controlling the actuators to adjust the air or liquid flow within the cooling system of FIG. 1 according to an aspect of the invention.

FIG. 4 is a flow diagram of a process 400 for controlling the actuators to adjust the air or liquid flow through the cooling system 100. One or more computers or one or more data processing apparatuses, for example, the one or more processors, such as the ECU 104, may implement the process 400 to control the cooling system 100.

The cooling system 100 obtains an initialization request (402). The initialization request initiates or makes operational the cooling system 100. The cooling system 100 may receive the initialization request when a user activates the cooling system 100, e.g., when a user activates the cooling system 100 from the user interface 124 or when the vehicle 102 is powered on. The cooling system 100 may receive the initialization request from one or more sensors 126. For example, when an electric vehicle (EV) and/or fuel cell electric vehicle (FCEV) is turned on, a fuel cell sensor may detect that the fuel cell 118 is in operation and send the initialization request to the cooling system 100 in response to detecting that the fuel cell 118 is turned on.

The cooling system 100 may generate an interpolated homotopic operating state (IHOS) model to estimate one or more unknown homotopic operating parameters, conditions or states based on known operating parameter, condition or state, such as a temperature, flow rate or resistance, and/or pressure of the air or liquid flowing through a pipe 130, a component or an actuator 106 (404). The process for generating the IHOS model and using the IHOS model to predict, determine or estimate an unknown parameter, condition or state is described, for example, in U.S. patent application Ser. No. 15/806,239, which is hereby incorporated by reference. The cooling system 100 may use the IHOS model to predict or estimate different parameters within the one or more components, the one or more actuators 106 or the one or more pipes 130. In some implementations, the cooling system 100 may use one or more sensors 126 to measure or obtain the operating parameter, condition or state.

The cooling system 100 may obtain a parameter, such as a flow rate, pressure or temperature, of the air or liquid flow (406). The cooling system 100 may measure the parameter using the one or more sensors 126, such as a pressure sensor, a temperature sensor or a speed sensor. Other parameters the cooling system may obtain include the speed of the motor of the pump 110. The cooling system 100 may use the obtained parameter to predict or determine the total or initial mass flow through a first pipe of the multiple interconnecting pipes 130.

Figure 6:
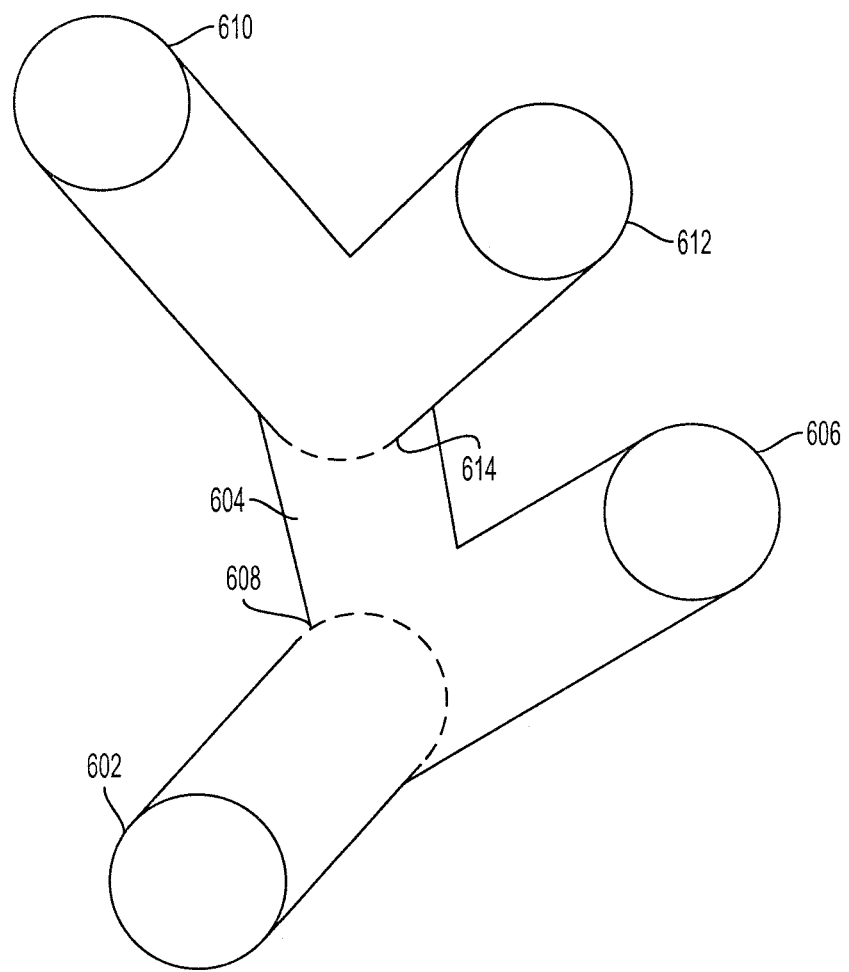
FIG. 6 shows an example set of pipe branches that the air or liquid flows through using the cooling system of FIG. 1 according to an aspect of the invention.

The cooling system 100 may determine an initial mass flow of the air or liquid that flows through a pipe, such as a first main pipe 602, before the pipe splits or branches off into multiple pipes, such as a second branch pipe 604 and a third branch pipe 606 in FIG. 6, for example (408). A pipe that splits or branches off into multiple pipes at a pipe junction will herein be referred to as a "main pipe" and the multiple pipes will herein be referred to as a "branch pipe." In some instances, a "branch pipe" may subsequently be referred to as another "main pipe" when the "branch pipe" splits or branches off into another set of multiple pipes.

The cooling system 100 may determine the initial mass flow using the IHOS model. The cooling system 100 may input the obtained parameter into the IHOS model as the known operating parameter into the IHOS model to determine or interpolate the unknown initial mass flow of the first main pipe. In some implementations, the cooling system may measure, detect or obtain the initial mass flow through the main pipe 602 using one or more sensors 126.

The cooling system 100 determines or predicts the flow resistance and/or mass flow of the air or liquid within the main pipe and the one or more branch pipes that branch or split off the main pipe at a pipe junction, such as the pipe junction 606 or 202a, based on the initial mass flow (410). The cooling system 100 may use a recursive algorithm, as described in FIG. 5 for example, to estimate the flow resistance and/or mass flow, which allows the ECU 104 to perform the calculations in real-time. By determining, predicting or estimating the flow resistance in real-time in the ECU 104, the cooling system 100 is able to react to changes to the air or liquid parameters, such as pressure, temperature or flow rate of the air or liquid flowing within the pipes 130, the actuators 106, and the components with minimal delay. This keeps the parameters within the hardware limitations of the components and allows the fuel cell 118 to generate electrical energy at peak efficiency. Moreover, by performing the calculation or determination for each pipe, the cooling system 100 more accurately adjusts the one or more actuators 106 to maintain the parameters within a safe operating region defined by the hardware limitations of the components and to increase electrical energy generation efficiency.

Figure 5:
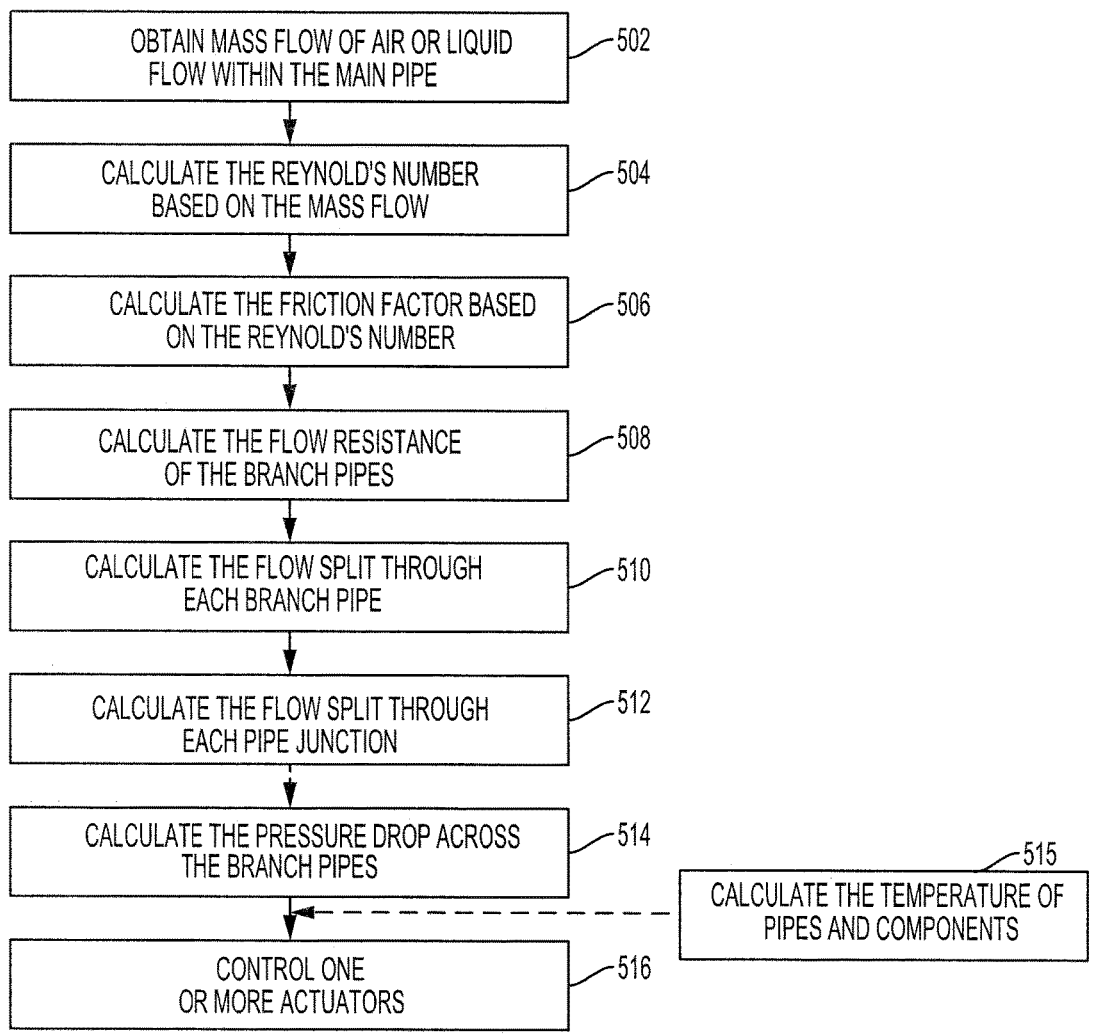
FIG. 5 is a flow diagram of an example process for determining flow resistance within a pipe of the cooling system of FIG. 1 according to an aspect of the invention.

The cooling system 100 may calculate or estimate the flow resistance within the main pipe 602 and the two or more branch pipes 604, 606 based on the determined initial mass flow. The cooling system 100 may determine a temperature of the air or liquid flow through the two or more branch pipes 604, 606 using the mass flows. The cooling system 100 may determine the fluid viscosity based on the temperature of the air or liquid flow, and then, calculate the flow resistance based on the fluid resistance. The cooling system 100 may calculate or estimate the flow resistance of the air or liquid within all the pipes of the multiple interconnected pipes 130 or a particular set of pipes at a particular pipe junction of the one or more pipe junction, such as the main pipe 130*d* that splits or branches off into branch pipes 130*e*-*f* that feed into the fuel cell stack 118 or the inter cooler 120, respectively. In another example, the cooling system 100 may calculate or estimate the flow resistance of air or liquid within the pipes 130*a*-*c* that flow into and out of the three-way valve 112 and directed toward or from the radiator 128, the inter cooler 120 and the fuel cell 118. FIG. 5 further describes the process for determining, predicting or estimating the flow resistance of air or liquid within individual pipes of the multiple interconnected pipes. In some implementations, the cooling system 100 may use one or more sensors 126 to determine the flow resistance at the one or more pipe junctions.

The cooling system 100 controls the one or more actuators to adjust the air or liquid flow and cooling capability within the multiple interconnected pipes 130 based on the estimated, determined or predicted flow resistance of the air or liquid flow within one or more of the multiple interconnected pipes 130 (412). For example, the ECU 104 and/or the actuator controller 122 may signal the speed of the motor of the pump 110 to increase/decrease or the speed of the radiator fan to increase/decrease to increase/decrease suction of the air or liquid into the fuel cell 118 or the radiator 128. In another example, the actuator controller 122 may signal to the three-way valve 112 to partially open, open, and/or close one, two or all three of the pipes 130*a*-*c* to manage the air or liquid flow through the pipes 130*a*-*c* to the components. By adjusting the air or liquid flow, the cooling system 100 controls the cooling capability of the air or liquid that flows into the one or more components, which manages or adjusts the temperature of the one or more components so that the one or more components operate within a safe operation region or within hardware limitations. While the flow resistance is important, the cooling system 100 controls the actuators based on the actual flow quantity through each pipe, which is a function of the flow resistance.

The cooling system 100 may display one or more indicators on the user interface 124 (414). The one or more indicators may notify the user that the cooling system 100 is initialized or that the cooling system 100 is adjusting or has adjusted one or more actuators 106 to control the air or liquid flow through the pipes 130 and the components. The one or more indicators may alert the user that a parameter, such as the air pressure, in a component, such as the fuel cell 118, exceeds a threshold amount that results in inefficient generation of electrical energy or exceeds the hardware limitation of the component.

FIG. 5 is a flow diagram of a process 500 for determining, predicting or estimating the flow resistance through the one or more pipes of the multiple interconnected pipes within the cooling system 100. One or more computers or one or more data processing apparatuses, for example, the one or more processors, such as the ECU 104, may implement the process 500 to determine or estimate the flow resistance.

The cooling system 100 obtains the mass flow, $\dot{m}$, of air or liquid flow within the main pipe 602, as described above in FIG. 4 for example (502). The cooling system 100 calculates a Reynold's number (Re) based on the mass flow (504). The Reynold's number is a quantity in fluid dynamics that assists in predicting flow patterns in different fluid flow situations. The ECU 104 uses the Re to determine the friction factor, $f_D$, and flow resistance, Z, within the pipes 130. The Re is a function of the mass flow, $\dot{m}$, of the pipe that the liquid or air is flowing through, the diameter, D, of the pipe through which the air or liquid is flowing through, the cross-sectional area, A, of the pipe through which the air or liquid is flowing through the dynamic velocity, μ. The ECU 104 may obtain the values for the diameter and cross-sectional area of the pipe along with the viscosity of the liquid or air from the memory 108 where the values may be stored. The ECU may calculate the Re using the following equation:

$$Re = \frac{\dot{m}D}{A\mu}.$$

The cooling system 100 determines the friction factor, $f_D$, of the air or liquid flow within the pipes 130 (506). The cooling system 100 determines friction factor using the Darcy-Weisbach formula where Roughness corresponds to a roughness of the material of the pipe and is a known property of the pipe. The ECU 104 may calculate friction factor using the following equation:

$$f_D = \frac{1}{\left[-1.8\log_{10}\left(\frac{6.9}{Re} + \left(\frac{\text{Roughness}}{3.7D}\right)^{1.11}\right)\right]^2}.$$

Given the friction factor, the cooling system 100 calculates the flow resistance, Z, across each of the branch pipes (508). The ECU 104 may calculate the flow resistance, such as the flow resistance through a first branch pipe, $Z_1$, and a flow resistance through a second branch pipe, $Z_2$, using the following equation:

$$Z = \frac{f_D(L + L_{eq})}{4D\rho A^2}.$$

For pipes in parallel or in series, the cooling system 100 may calculate an equivalent flow resistance in order to calculate the flow resistance through each of the pipes 130. The equivalent flow resistance may be calculated, using the following equation:

$$Z_{eq\ parallel} = \frac{Z_2}{\left(1 + \sqrt{\frac{Z_1}{Z_1}}\right)^2}$$

$$Z_{eq\ series} = Z_1 + Z_2.$$

The cooling system 100 determines the mass flow split through each branch pipe, where the mass flow, $\dot{m}$, is the sum of the mass flow of each branch pipe, $\dot{m}_{1\ \ldots\ n}$, where n is the number of parallel branch pipes because the flow entering a pipe junction is conserved (512). The ECU 104 may calculate the flow split through each pipe junction using the following equations:

$$\dot{m}_1 = \frac{\dot{m}_{total}}{1 + \sqrt{\frac{Z_1}{Z_2}}}, \text{ and}$$

-continued $$\dot{m}_2 = \dot{m}_{total} - \dot{m}_1.$$

The cooling system 100 may repeat the determination of the mass flow split for each pipe junction within the entire cooling system 100 so that the cooling system 100 determines the flow split through each interconnected pipe within the entire cooling system (512).

The cooling system 100 calculates the pressure drop, ΔP, across the branch pipes using the friction factor (514). The pressure drops across the branch pipes that are parallel are equal. Thus, $\Delta P_{Main\_pipe\_602} = \Delta P_{Branch\_pipe\_604} = \Delta P_{Branch\_pipe\_606}$. The ECU 104 may calculate the pressure drop as a function of the mass flow, $\dot{m}$, pipe length, L, the pipe equivalent length, $L_{eq}$, the diameter, D, of the pipe, density, ρ, of the air or liquid, the cross-sectional area, A, and the friction factor, $f_D$. The ECU 104 may calculate the pressure drop using the following equation:

$$\Delta P = \frac{L + L_{eq}}{2D} * \frac{\dot{m}^2 f_D}{\rho A^2}.$$

The cooling system may determine the cross-sectional area and the diameter of the pipe using a lookup table. The cooling system may determine the density also using a lookup table or a sensor. The various values, such as the cross-sectional area and the diameter, account for the geometry of the pipe.

The cooling system 100 may use the calculated mass flows of the branch pipe and/or the flow resistances and determine a temperature and a flow rate of the air or liquid flow into any of the pipes 130 and components, such as the fuel cell 118 and/or the radiator 128 (515). The cooling system 100 may adjust the one or more actuators 106 to ensure that the one or more components operate within a safe operation region where the one or more components operate within hardware limitations. Moreover, the cooling system 100 may use the temperature values throughout the pipes 130 to provide more accurate and robust temperature control, as the cooling system 100 may provide a temperature gradient or mapping of air or liquid flow through the entire vehicle.

The cooling system 100 may use the calculated mass flows of a branch pipe and/or the equivalent flow resistance as an input to a subsequent pipe that branches off the branch pipe at another pipe junction to calculate the mass flows of the subsequent pipe that branches off (514). For example, the branch pipe 604 may split or branch off into at least two additional pipes, and thus, the mass flow of the branch pipe 604 is the initial mass flow when calculating the mass flow for the branch pipes 610, 612 when the air or liquid flows into the pipe junction 614. The cooling system 100 may calculate an equivalent resistance, $Z_{eq}$, and use the equivalent resistances to determine the mass flow.

The cooling system 100 adjusts the one or more actuators 106 based on the determined mass flow split through each pipe to control different parameters, such as the pressure, the temperature, and the flow rate, through the one or more components (516). This improves electrical energy generation efficiency and maintains the one or more components within a safe operation region and within hardware limitations.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A fluid system for controlling flow of air or liquid within a vehicle, comprising:
    one or more actuators that control the flow of the air or liquid;
    a plurality of interconnecting pipes that transport the air or liquid; and
    an electronic control unit configured to:
        determine an initial mass flow of the air or liquid through at least one of the plurality of interconnecting pipes;
        determine a mass flow of the air or liquid within each pipe of the plurality of interconnecting pipes based on the initial mass flow;
        predict a cooling capability of the air or liquid within each pipe; and
        control the one or more actuators to regulate or control cooling of one or more components of the vehicle based on the predicted cooling capability.

2. The fluid system of claim 1, wherein to determine the initial mass flow of the air or liquid, the electronic control unit is configured to calculate the initial mass flow using an interpolated homotopic operating state (IHOS) model.

3. The fluid system of claim 1, further comprising:
    an actuator controller connected to the one or more actuators and configured to control the one or more actuators, wherein the one or more actuators include at least one of a pump, a three-way valve or a radiator fan that manages or controls the flow of the air or liquid through the plurality of interconnecting pipes.

4. The fluid system of claim 3, wherein the electronic control unit is configured to cause the actuator controller to adjust at least one of the one or more actuators.

5. The fluid system of claim 3, wherein to control the one or more actuators the actuator controller is configured to open, partially open or close at least one way of the three-way valve, adjust a speed of the radiator fan or adjust a speed of the pump.

6. The fluid system of claim 1, wherein to determine the mass flow of the air or liquid within each pipe of the plurality of interconnecting pipes based on the initial mass flow the electronic control unit is configured to calculate the mass flow of the air or liquid within each pipe in real-time.

7. The fluid system of claim 6, wherein to calculate the mass flow of the air or liquid within each pipe in real-time the electronic control unit is further configured to:
    calculate one or more flow splits of the flow of the air or liquid within the plurality of interconnecting pipes using a recursive algorithm.

8. The fluid system of claim 6, wherein the plurality of interconnecting pipes include a first pipe, a second pipe and a third pipe, wherein the first pipe is connected to and branches or splits off into the second pipe and the third pipe, wherein to calculate the mass flow of the air or liquid within each pipe of the plurality of interconnecting pipes includes calculating a flow split of the flow of the air or liquid from the first pipe to the second pipe and the third pipe.

9. The fluid system of claim 1, further comprising:
a plurality of components including a fuel cell stack, an inter cooler and a radiator, wherein the plurality of interconnected pipes connect the plurality of components together and provides the air or liquid to the plurality of components.

10. A fluid system for controlling flow of air or liquid, comprising:
a pump configured to pump the air or liquid;
a fuel cell stack configured to receive the air or liquid;
a plurality of pipes each configured to transport the air or liquid;
an actuator controller to control the pump, a radiator fan or a three-way valve; and
an electronic control unit (ECU) connected to the actuator controller and configured to:
determine an initial mass flow of the air or liquid in the plurality of pipes;
determine at least one of a temperature or mass flow of the air or liquid in each pipe;
determine a flow resistance of the air or liquid in each pipe of the plurality of pipes based on the at least one of the temperature or the mass flow; and
control the flow of the air or liquid based on the determined flow resistance of the air or liquid in each pipe.

11. The fluid system of claim 10, wherein to determine the at least one of the temperature or the mass flow of the air or liquid, the electronic control unit is configured to calculate the at least one of the temperature or the mass flow of the air or liquid in each pipe in real-time.

12. The fluid system of claim 11, wherein to calculate the at least one of the temperature or the mass flow, the electronic control unit is further configured to:
calculate one or more flow splits of the flow of the air or liquid within the plurality of pipes using a recursive algorithm.

13. The fluid system of claim 11, wherein the plurality of pipes include a first pipe, a second pipe and a third pipe, wherein the first pipe is connected to and branches or splits off into the second pipe and the third pipe, wherein to calculate the at least one of the temperature or the mass flow includes calculating a flow split of the flow of the air or liquid from the first pipe to the second pipe and the third pipe.

14. The fluid system of claim 10, wherein the electronic control unit is configured to:
calculate a Reynold's number based on the mass flow; and
calculate a friction factor based on the Reynold's number.

15. The fluid system of claim 14, wherein the electronic control unit is configured to determine the flow resistance based on the calculated friction factor.

16. A fluid system, comprising:
one or more actuators including a radiator fan, a pump and a three-way valve;
a plurality of pipes configured to transport air or liquid; and
an electronic control unit coupled to the one or more actuators and configured to:
determine an initial mass flow of the air or liquid,
determine a flow resistance or mass flow of the air or liquid in each pipe of the plurality of pipes based on the initial mass flow of the air or liquid, and
control the one or more actuators to adjust flow of the air or liquid based on the flow resistance or the mass flow of the air or liquid in each pipe.

17. The fluid system of claim 16, wherein the electronic control unit is configured to:
calculate a Reynold's number based on the initial mass flow; and
calculate a friction factor based on the Reynold's number.

18. The fluid system of claim 17, wherein the electronic control unit is configured to determine the flow resistance based on the calculated friction factor.

19. The fluid system of claim 16, wherein the electronic control unit is configured to determine the flow resistance or the mass flow of the air or liquid in each pipe of the plurality of pipes in real-time using a recursive algorithm.

20. The fluid system of claim 16, wherein to control the one or more actuators to adjust the flow of the air or liquid the electronic control unit is configured to:
increase or decrease a speed of a motor of the pump or a speed of the radiator fan; or
control a position of the three-way valve.

* * * * *